May 6, 1947.   J. E. MILBURN   2,420,088
CHILD'S CART
Filed Aug. 7, 1946
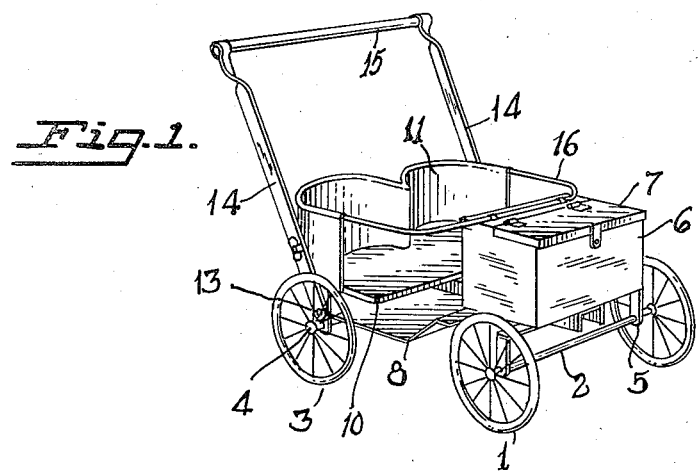
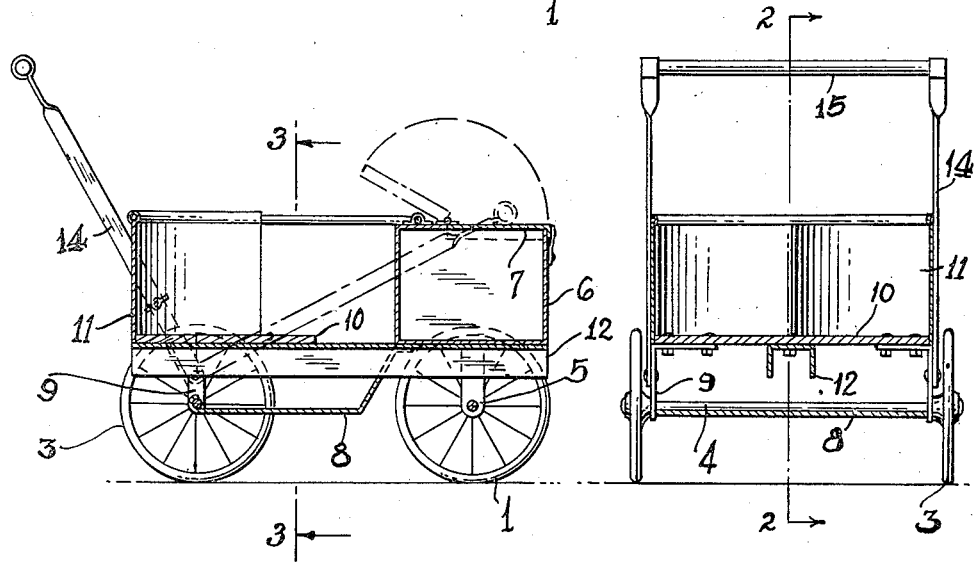
INVENTOR.
JOHN E MILBURN
BY
ATTORNEY Patented May 6, 1947

2,420,088

UNITED STATES PATENT OFFICE 2,420,088

CHILD'S CART

John E. Milburn, Redwood City, Calif.

Application August 7, 1946, Serial No. 689,027

1 Claim. (Cl. 280—47)

This invention relates to improvements in vehicles for children, and more particularly to a cart adapted to accommodate twins.

An object of my invention is to provide an improved push cart having a novel construction which is capable of accommodating two children.

Another object of my invention is to provide an improved hand controlled vehicle of the kind characterized, embodying a simplified construction wherein means is provided for carrying groceries or other objects in addition to two children.

Other and further objects of my invention will be pointed out hereinafter or will be indicated in the appended claims, or will be obvious to one skilled in the art upon an understanding of the present disclosure. For the purpose of this application I have elected to show herein certain forms and details of a children's vehicle representative of my invention; it is to be understood, however, that the embodiment of my invention herein shown and described is for the purpose of illustration only and that therefore it is not to be regarded as exhaustive of the variations of the invention.

In the accompanying drawings:

Fig. 1 is a perspective view of a children's cart embodying the principles of my invention;

Fig. 2 is a longitudinal sectional view taken on the line 2—2 of Fig. 3; and

Fig. 3 is a sectional view taken on the line 3—3 of Fig. 2.

Referring to the drawings, the front wheels 1 of the cart are mounted on an axle rod 2 while the rear wheels 3 are mounted on an axle rod 4.

Secured to the front axle rod 2 are two inverted L-shaped brackets 5 which are suitably secured to and support the forward part of a box or trunk 6 having a hinged lid 7. The rear part of the box or trunk 6 is suitably secured to the forwarded end of an angular floor member or plate 8, the rear end of which is formed with an upwardly bent part or eye which engages with and is supported by the rear axle rod 4.

Mounted on the rear axle rod 4 are two side brackets 9 having an inverted L shape, the said brackets being suitably secured to the opposite ends of a duplex seat 10. The brackets 9 support the seat 10 in a raised position above the floor member 8. The rear edge of the seat is formed with two similarly rounded portions which are joined at their inner ends, and secured as by screws, nails or other means to the said rear edge is a back rest 11 which is also shaped to provide two rounded connected back portions. The seat 10 and the back rest 11 forms two individual seating sections capable of accommodating two children. Underlying the central portions of the seat 10 and the box or trunk 6 and secured thereto as by bolts or screws is an inverted U-shaped angle iron 12. The angle iron constitutes a brace member and also provides means for dividing the vehicle's space above the floor member 8 into two areas, whereby the legs and feet of the two children seated on the seat are maintained in separated positions. The angle iron 12 may be embodied in other suitable forms if desired.

Pivotally secured as at 13 to the rear brackets 9 are two side bars 14 which are connected at their rear ends by a handle 15. The side bars 14 are normally maintained in upward inclined positions by bolts and wing nuts which engage with the said bars and the back rest 11. The removal of the bolts and wing nuts permits the bars 14 and handle 15 to be swung forwardly to a folded position wherein the handle is positioned in front of the vehicle. In such a folded position the vehicle may be conveniently stored or carried in an automobile.

Secured to the upper edge of the back rest 11 and to the box or trunk 6 is an open frame or enclosure 16 for normally maintaining the children inside the cart. The enclosure 16 also provides a hand and arm rest for the children.

What I claim is:

In a cart for children, front and rear axle rods, wheels for supporting the axle rods, front and rear pairs of brackets mounted on the axle rods, a trunk supported at its front side by the front brackets, a seat supported at its opposite ends on the rear brackets, the said seat having a back formed with duplex curved portions, a floor member secured at its rear end to the rear axle rod and at its front end to the trunk, a centrally disposed brace and partition member secured to the seat and to the trunk, the said brace and partition member being centrally arranged to separate the space above the central part of the floor member into two areas for the occupancy of the legs and feet of two children occupying the seat, and a handle member for wheeling the cart from place to place.

JOHN E. MILBURN.